United States Patent [19]

Bonnaud et al.

[11] Patent Number: 5,037,711
[45] Date of Patent: Aug. 6, 1991

[54] ASSEMBLY OF ACCUMULATOR CELLS JUXTAPOSED TO FORM A UNIT

[75] Inventors: Francis Bonnaud, Salignac; Jean-Pierre Flipo, Bordeaux, both of France

[73] Assignee: Saft, S.A., Romainville, France

[21] Appl. No.: 485,508

[22] Filed: Feb. 27, 1990

[30] Foreign Application Priority Data

Mar. 3, 1989 [FR] France .............. 89 02792

[51] Int. Cl.$^5$ .............................. H01M 2/10
[52] U.S. Cl. .................. 429/156; 429/99; 429/187
[58] Field of Search .......... 429/99, 156, 159, 187

[56] References Cited

U.S. PATENT DOCUMENTS

| | | | |
|---|---|---|---|
| 2,399,893 | 5/1946 | Scholz | 224/48 |
| 2,710,220 | 6/1955 | Rupp | 429/187 X |
| 2,902,532 | 9/1959 | Toce et al. | 429/99 |
| 3,061,662 | 10/1962 | Toce et al. | 429/99 |
| 3,167,458 | 1/1965 | Brazell | 136/166 |
| 3,463,672 | 8/1969 | Schmidt | 429/187 X |
| 4,020,244 | 4/1977 | Selinko | 429/159 X |

FOREIGN PATENT DOCUMENTS

| | | |
|---|---|---|
| 0065349 | 11/1982 | European Pat. Off. |
| 0636191 | 4/1928 | France |
| 1267153 | 6/1961 | France |
| 2536373 | 5/1984 | France |
| 0238775 | 8/1925 | United Kingdom |
| 0285985 | 2/1928 | United Kingdom |

Primary Examiner—Stephen J. Kalafut
Attorney, Agent, or Firm—Kenyon & Kenyon

[57] ABSTRACT

An assembly of accumulator cells juxtaposed to form a unit comprises a peripheral binding and holding system. The peripheral binding is an insulative material strap having an insulative material buckle. The insulative material(s) are resistant to the accumulator electrolyte. The strap is fastened by the buckle and is immobilized vertically against the side walls of the unit. The holding system comprises a rigid flat support made from an electrolyte resistant material disposed beneath the cells and extending longitudinally thereof. To this are attached at least two carrying straps each disposed between two cells and defining a respective handle above the cells.

10 Claims, 5 Drawing Sheets

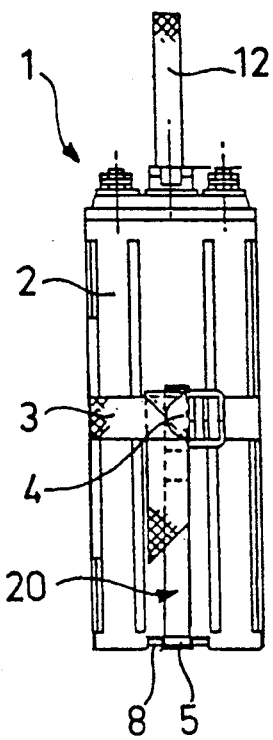
FIG. 6
FIG. 7
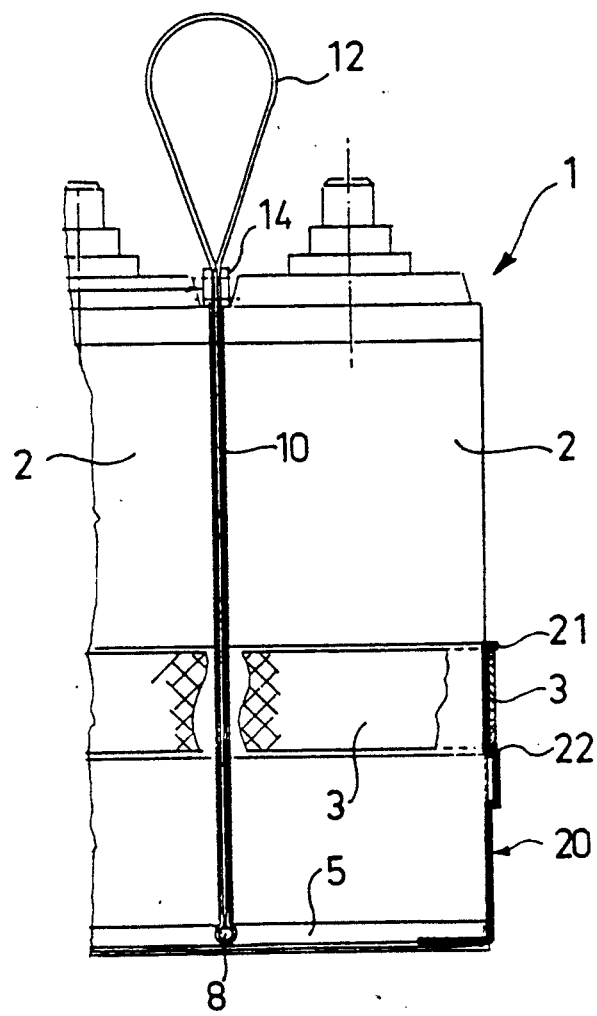

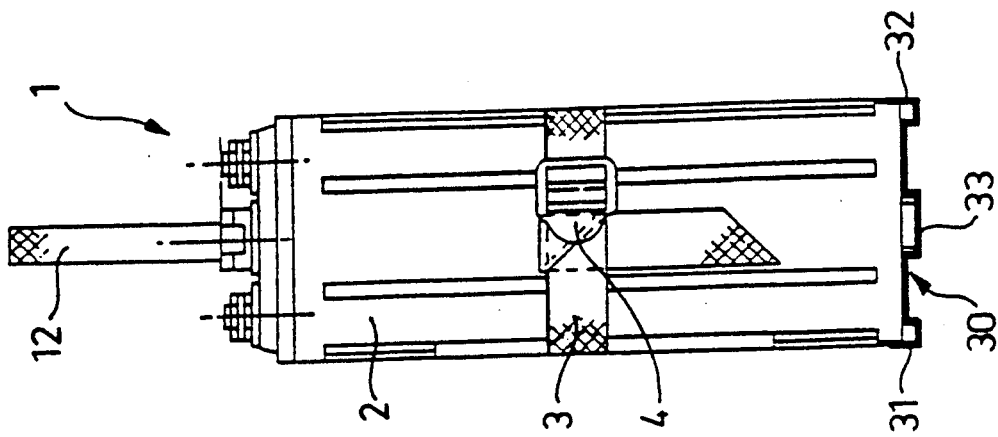
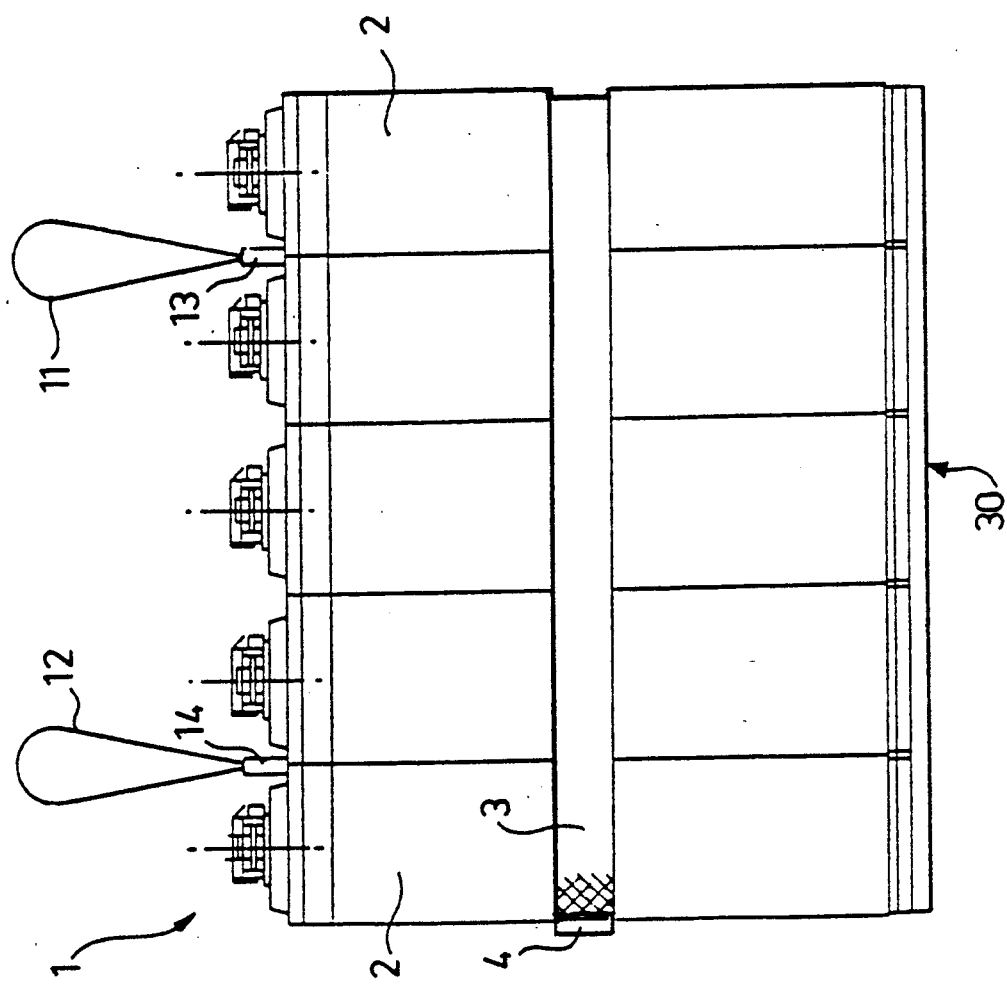

ASSEMBLY OF ACCUMULATOR CELLS JUXTAPOSED TO FORM A UNIT

BACKGROUND OF THE INVENTION

1. Field of the invention

The present invention concerns an assembly of accumulator cells juxtaposed to form a unit provided with holding means to facilitate handling it.

The unit must be readily demountable if it is necessary to change a cell. Assembly and demounting operations must not require the use of any special tools.

The assembly must have overall dimensions as close as possible to those of the cells constituting it.

Finally, it must have a service life of 10 to 15 years in environmental conditions that may be severe.

2. Description of the prior art

Various types of assembly are already in routine use.

In a first known type assembly the accumulator cells are juxtaposed and merely surrounded by adhesive tape. The assembly is demountable, but re-assembly involves the provision of a special adhesive tape. What is more, there is no adhesive that can be guaranteed for the service life mentioned above. An assembly of this kind does not comprise any holding means and handling it is therefore impractical.

In a second known type assembly the accumulator cells are encircled by a metal or plastics material strap that is fastened with clips or a metal strap that is welded. Demounting is simply a matter of cutting the strap, but re-assembly after replacing a cell entails using a special banding or welding machine, with the risk of the cells being damaged through excessive binding forces.

In a third known type assembly the accumulator cell containers are formed with dovetails on their vertical edges. Metal clips are used to interlock adjacent cells. The dovetails at the two ends of the unit enable holding means to be fixed on. This assembly has disadvantages. The thermoplastics materials used to mold the cell containers are not well able to withstand the mechanical loads resulting from the convex angular shapes of the dovetails, which are difficult to mold, or the localized forces exerted by the metal parts during handling.

An object of the present invention is to avoid these disadvantages and to provide an assembly of accumulator cells in a unit that is easy to transport, demount and re-assemble and handling of which does not apply any localized stresses to the accumulator cell containers or covers.

SUMMARY OF THE INVENTION

The present invention consists in an assembly of accumulator cells juxtaposed to form a unit comprising a peripheral binding and holding means, wherein:

said peripheral binding is an insulative material strap having an insulative material buckle, said insulative material(s) being resistant to the accumulator electrolyte, said strap being adapted to be fastened by said buckle and immobilized vertically against the side walls of said unit, and said holding means comprise a rigid flat support made from an electrolyte resistant material disposed beneath said cells and extending longitudinally thereof to which are attached at least two carrying straps each disposed between two cells and defining a respective handle above said cells.

Said strap may be cut, molded or woven, flexible or semi-rigid, and in the form of a belt or a thong.

To form said handles, said carrying straps are fitted with screws, rivets or the like which further attach to said carrying straps electrolyte resistant insulating material parts forming abutments.

In an advantageous embodiment said strap is immobilized vertically in recesses formed in the side walls of said unit. If a recess of this kind is of insufficient width, said strap is immobilized vertically in clips accommodated in recesses provided in the side walls of said unit.

In another embodiment the strap is immobilized vertically in parts fixed to said rigid flat support and disposed against the end side surfaces of said unit.

Said rigid flat support accommodated under said cells, in a groove, for example, is preferably a longitudinal member. If the bottom of the cells is flat the flat support may be a baseplate.

Said carrying straps may be riveted or screwed to said flat support. They may instead be fixed to rods attached to the rigid flat support or in slots that the latter incorporates.

Other characteristics and advantages of the invention will emerge from the following description of various embodiments which is given by way of non-limiting example only.

BRIEF DESCRIPTION OF THE DRAWINGS

FIG. 6 is a schematic side view of a third embodiment of an assembly in accordance with the invention.

FIG. 7 shows schematically and partially in longitudinal cross-section a detail of the assembly from FIG. 6.

FIG. 8 is a schematic view in elevation of a fourth embodiment of an assembly in accordance with the invention.

FIG. 9 is a schematic side view of the assembly from FIG. 9.

DETAILED DESCRIPTION OF THE INVENTION

Figure 1:
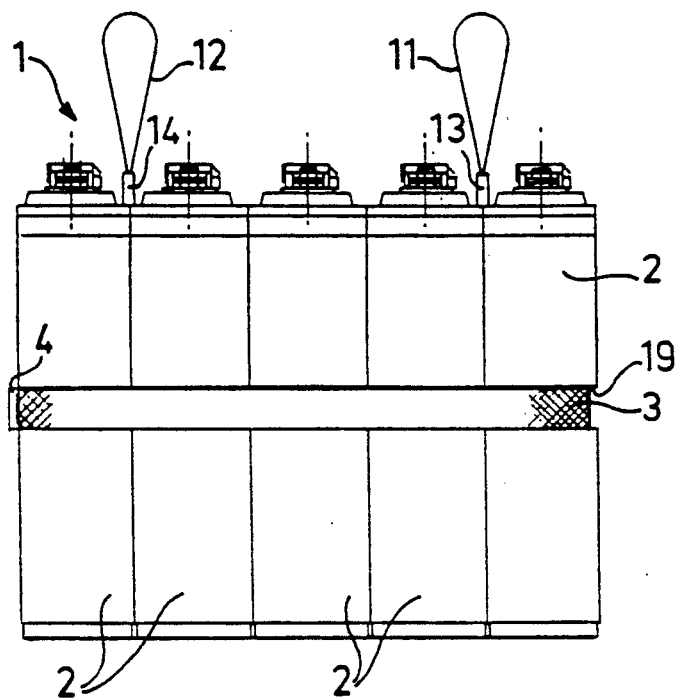
FIG. 1 is a schematic view in elevation of an assembly of accumulator cells in accordance with the invention.
Figure 2:
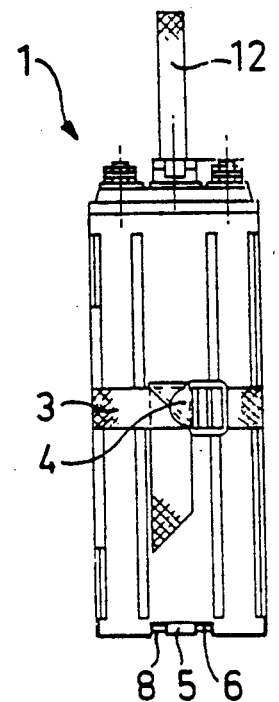
FIG. 2 is a schematic side view of the assembly from FIG. 1.

FIG. 1 shows an assembly in accordance with the invention of five juxtaposed accumulator cells 2. As illustrated in FIG. 2, a strap 3 with a buckle 4 is made from a material resistant to the electrolyte in and the environment of the accumulators and holds the cells 2 clamped together to from a unit 1. The strap 3 and its buckle 4 are made from man-made materials, for example 6—6 polyamide. The strap 3 is immobilized vertically against the wall of the unit 1 because it is accommodated in recesses 19 provided in vertical ribs on the side walls of the containers of the cells 2.

It is preferable to provide grooves and tabs on the vertical edges of the cells 2 to prevent them sliding laterally relative to each other.

The tightness of the strap when the assembly is put together may be moderated in order to reduce the permanent loads exerted on the accumulator cell containers.

Figure 3:
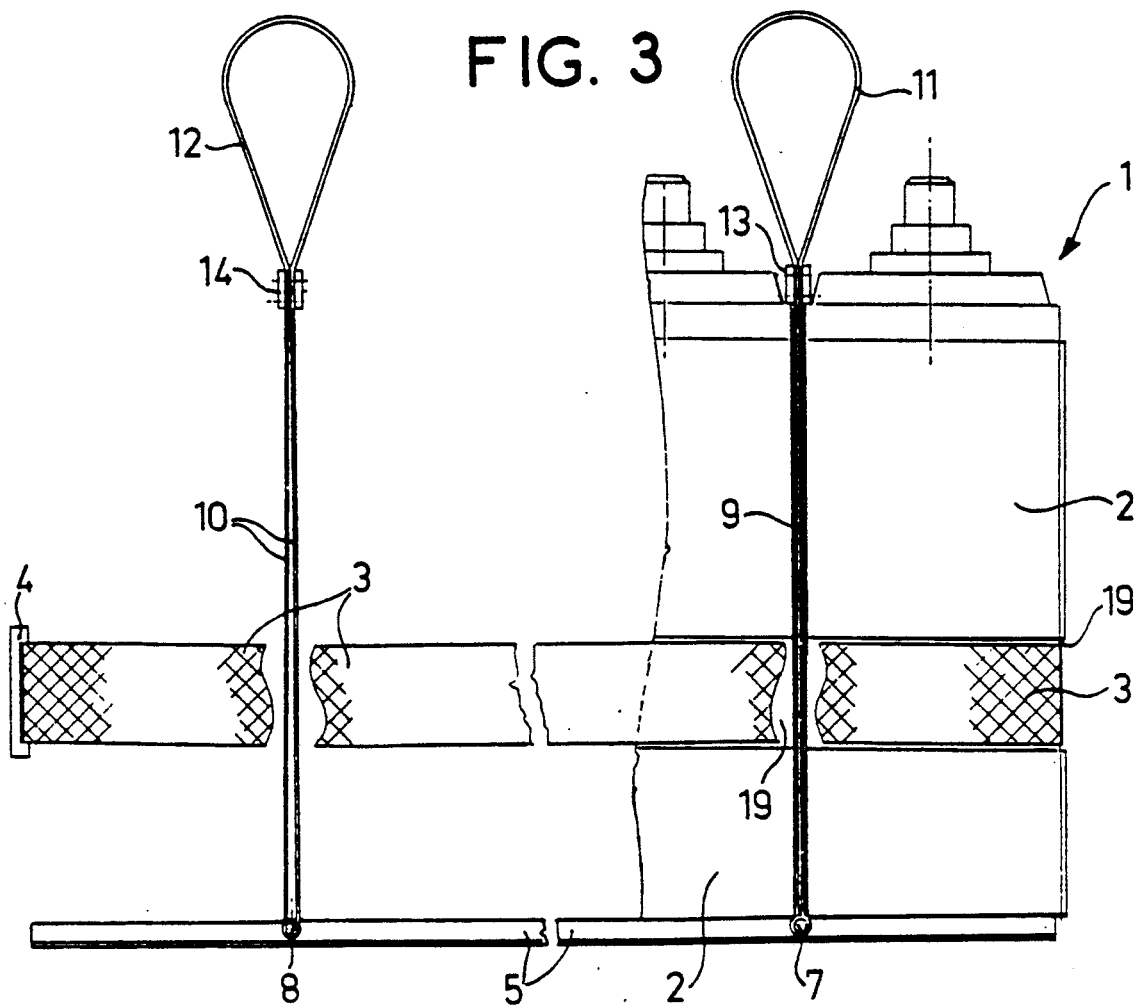
FIG. 3 is a schematic view of the assembly from FIG. 1 partly in longitudinal cross-section.

As illustrated in FIGS. 2 and 3, a metal longitudinal member 5 is accommodated in a longitudinal groove 6 in the bottom of the unit 1, along its axis; FIG. 3 shows that it is fitted with metal rods 7 and 8 respectively aligned with the gap between the first two and the last two cells 2. These rods may be welded or riveted to the longitudinal member 5.

Carrying straps 9 and 10 extend vertically between the cells 2 and respectively around the rods 7 and 8. The positions of the carrying straps and the rods are such that unwanted loads on the cell 2 containers are reduced during handling.

The carrying straps 9 and 10 form handles 11 and 12 above the unit 1 by virtue of being formed into closed loops by rivets or screws. These rivets or screws attach to the carrying straps 9 and 10 abutments 13 and 14 which bear on the upper part of the cell 2 covers. They are made from an insulative material that is resistant to the electrolyte in and the environment of the unit 1. In the case of alkaline accumulator cells, they are made from 6—6 polyamide, for example, rivetted to the carrying straps 9 and 10 using stainless steel rivets. They prevent the carrying straps 9 and 10 dropping down between the cells 2. They make it possible to maintain the carrying straps under slight tension, which favors holding the longitudinal member 5 against the bottom of the cells 2, and authorize handling of the unit 1 by means of a single handle 11, 12.

The assembly that has just been described is therefore simple to assemble and to demount without special tools. Only a wrench is needed to tighten and loosen the nuts making the electrical connections between two cells 2, which connections have been omitted to clarify the drawing.

The two handles 11 and 12 allow manual or mechanical handling of the unit 1. In normal handling by both handles all of the weight of the cells 2 is supported by the longitudinal member 5. The loads on the containers of the unit 1 are therefore minimized. For the same reason, the forces required of the strap are reduced. This facilitates fitting it, limits the tension needed at assembly time and avoids excessively high permanent loads on the containers of the unit 1.

In the event of inadvertent handling by one handle only no breakage of the carrying straps occurs and the strap prevents any dislocation of the unit 1 and any cell 2 from falling out.

The cost of the assembly in accordance with the invention is much lower than using conventional battery frames or boxes. Also, the service life of an assembly of this kind is at least equal to that of the accumulators, which is 10 to 15 years in the case of alkaline accumulators.

Figure 4:
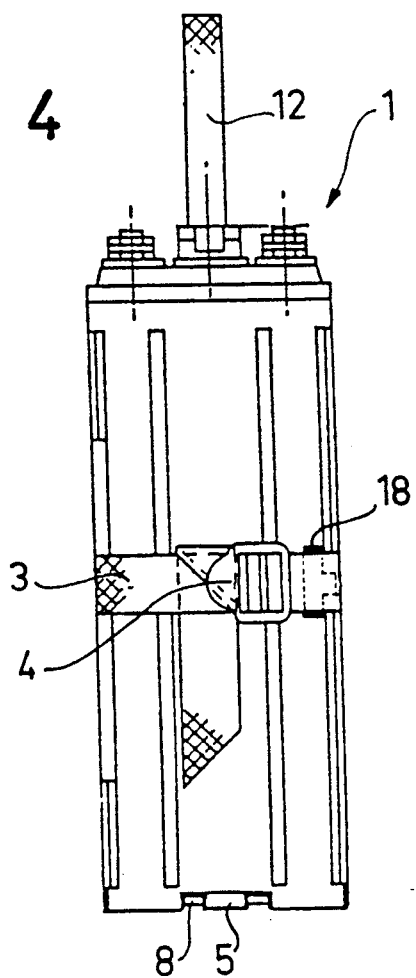
FIG. 4 is a schematic side view of a second embodiment of an assembly in accordance with the invention.
Figure 5:
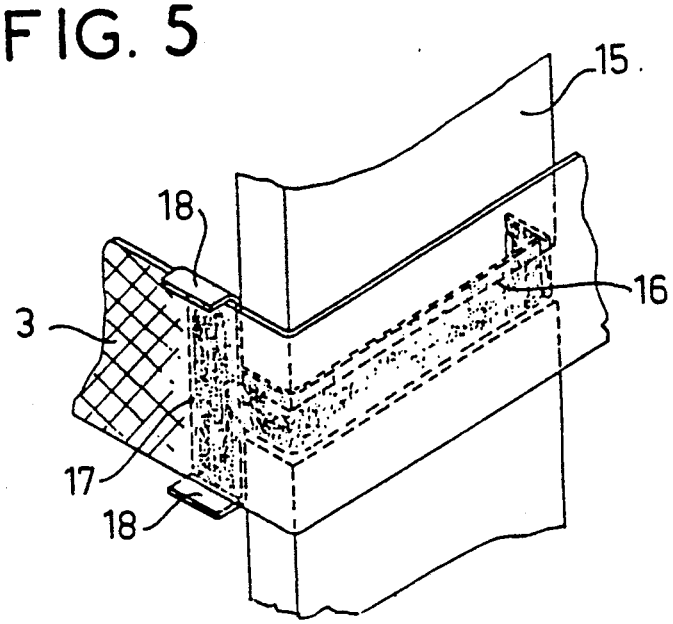
FIG. 5 is an enlarged view of the detail of FIG. 4 relating to the strap of the assembly.

FIGS. 4 and 5 show another embodiment of an assembly in accordance with the invention.

In this case, the side walls 15 of the unit 1 do not feature any groove 16 sufficiently wide to accommodate the strap 3; there is therefore provided in the groove 16 a metal clip 17 with two outwardly directed lugs 18 passing below and above the strap 3. It is preferable to use two clips 17 per unit 1 to immobilize the strap 3 properly.

In FIGS. 6 and 7 the side surface of the unit 1 does not comprise any recess at all to retain the strap 3. There is therefore used on each side of the unit 1 an L-shape metal or electrolyte resistant plastics material part 20 fixed to the longitudinal member 5. This part 20 incorporates two abutments 21 and 22 lying one on each side of the strap 3 to hold it in position.

In FIGS. 8 and 9 the bottom of the unit 1 is flat and cannot accommodate a longitudinal member 5. A baseplate 30 is therefore provided under it with upstanding edges 31 and 32 rising a short distance up the vertical surfaces of the unit 1. This baseplate or any equivalent support cooperates with the carrying straps 9 and 10 in the same way as with the longitudinal member 5, so as to raise the cells 2 by their base and align them.

A recess 33 accommodates two rods like the rods 7 and 8, for example, to retain the carrying straps 9 and 10.

Of course, the invention is not limited to the examples that have just been described.

Thus the carrying straps 9 and 10 serving as handles may be replaced by cut or molded flexible or semi-rigid insulating parts, thongs or belts, but in all cases the material thereof must be resistant to the electrolyte in and the environmental conditions of the accumulators.

The abutments 13 and 14 may be replaced by insulative material parts fixed by any appropriate means: screwing, overmolding, buckle system, etc. The abutments and the fixing parts must also be resistant to the electrolyte in and the environmental conditions of the accumulators.

Figure 10:
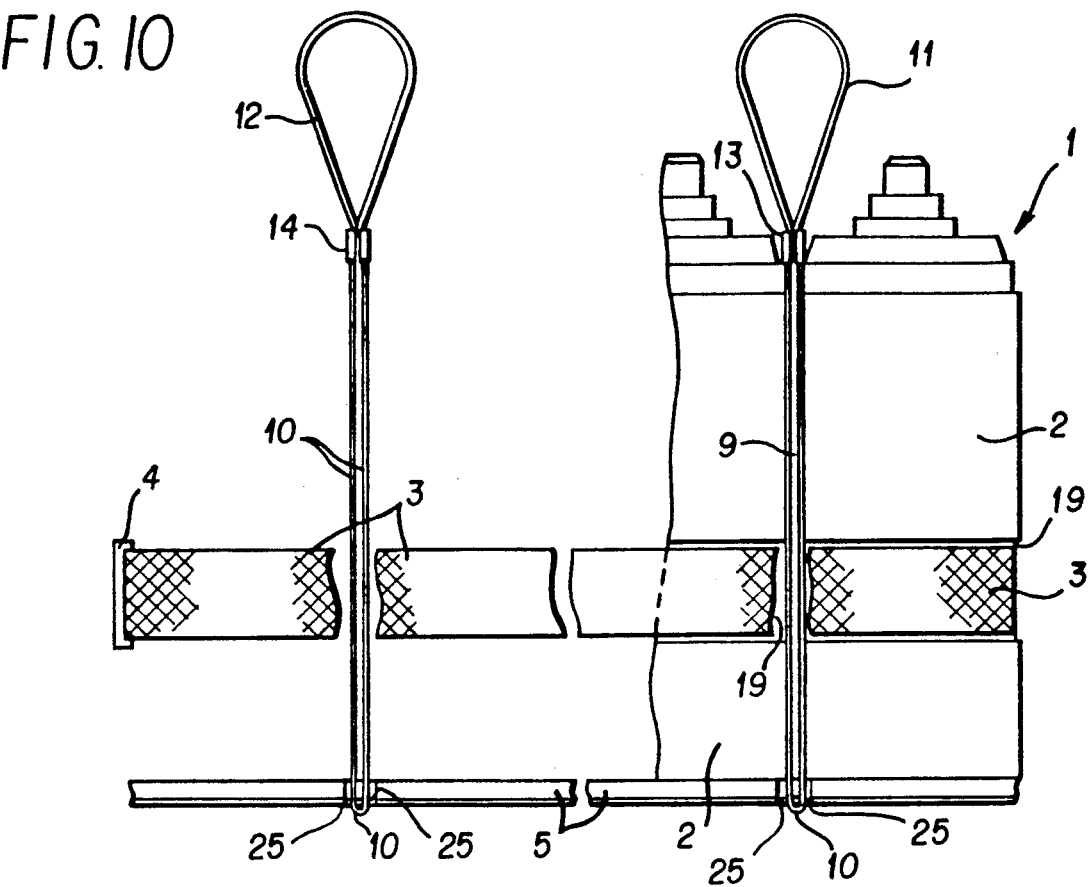
FIG. 10 is a further embodiment of the invention.
Figure 11:
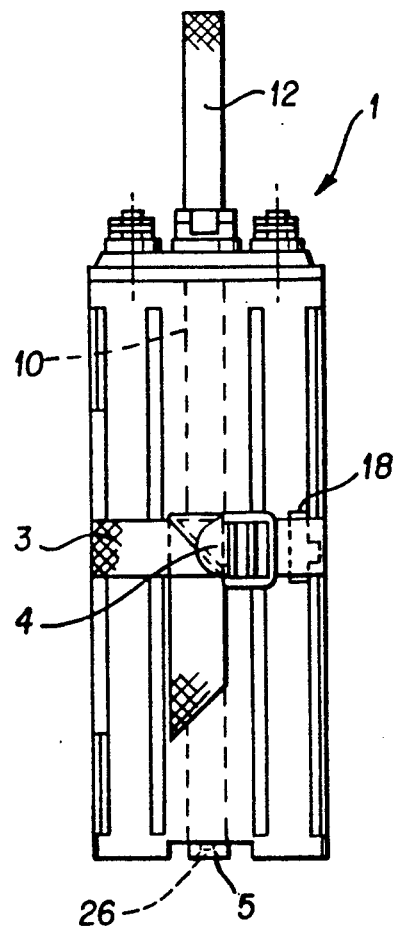
FIG. 11 is a schematic side view f yet a further embodiment of the invention.

The rods 7 and 8 may be replaced by other fixing means: carrying straps passing through slots in the longitudinal member, or carrying straps screwed or rivetted to the longitudinal members 5. The slots are illustrated in FIG. 10 and designated with reference numeral 25. The connectors are schematically illustrated in FIG. 11 and designated with reference numeral 26.

Any means may be replaced by equivalent means without departing from the scope of the invention.

There is claimed:

1. Assembly of accumulator cells juxtaposed to form a unit comprising a peripheral binding and holding means, wherein:

said peripheral binding is an insulative material strap having an insulative material buckle, said insulative material(s) being resistant to the accumulator electrolyte, said strap being adapted to be fastened by said buckle and immobilized vertically against the side walls of said unit, and said holding means comprise a rigid flat support made from an electrolyte resistant material disposed beneath said cells and extending longitudinally thereof to which are attached at least two carrying straps each disposed between two cells and defining a respective handle above said cells.

2. Assembly of accumulator cells according to claim 1 wherein said strap is cut, molded or woven, flexible or semi-rigid, belt or thong.

3. Assembly of accumulator cells according to claim 1 wherein to form said handles, said carrying straps are fitted with screws or rivets which further fix to said carrying straps electrolyte resistant insulative material parts forming abutments.

4. Assembly of accumulator cells according to claim 1 wherein said strap is immobilized vertically in recesses formed in the side wall of said unit.

5. Assembly of accumulator cells according to claim 1 wherein said strap is immobilized vertically in clips accommodated in recesses provided in the side wall of said unit.

6. Assembly of accumulator cells according to claim 1 further comprising elements coupled to said rigid flat support and disposed against the end side surfaces of said unit, said strap being vertically immobilized in said elements.

7. Assembly of accumulator cells according to claim 1 wherein said rigid flat support under said unit is a baseplate.

8. Assembly of accumulator cells according to claim 1 wherein said carrying straps are rivetted or screwed to said rigid flat support.

9. Assembly of accumulator cells according to claim 1 wherein said carrying straps are fixed to rods fastened to said rigid flat support.

10. Assembly of accumulator cells according to claim 1 wherein said carrying straps pass through slots in said rigid flat support.

* * * * *